United States Patent [19]

Ayash et al.

[11] Patent Number: 5,509,139
[45] Date of Patent: Apr. 16, 1996

[54] CIRCUIT FOR DISABLING AN ADDRESS MASKING CONTROL SIGNAL USING OR GATE WHEN A MICROPROCESSOR IS IN A SYSTEM MANAGEMENT MODE

[75] Inventors: Basem A. Ayash, Houston; Gary W. Thome, Tomball, both of Tex.

[73] Assignee: Compaq Computer Corp., Houston, Tex.

[21] Appl. No.: 34,300

[22] Filed: Mar. 22, 1993

[51] Int. Cl.$^6$ .................................................. G06F 12/02
[52] U.S. Cl. .................. 395/869; 395/823; 395/800; 364/926.9; 364/926.93; 364/946.9; 364/947.1; 364/947.4; 364/947.5; 364/958.2; 364/238.3; 364/259.7; 364/252.5; 364/259.1; 364/DIG. 1
[58] Field of Search ............................ 395/800, 400, 395/425, 500, 275, 325, 775, 725, 869, 823; 364/DIG. 1, DIG. 2

[56] References Cited

U.S. PATENT DOCUMENTS

| | | | |
|---|---|---|---|
| 4,580,240 | 4/1986 | Watanabe | 395/425 |
| 4,926,322 | 5/1990 | Stimac et al. | 395/500 |
| 5,027,273 | 6/1991 | Letwin | 395/400 |
| 5,063,499 | 11/1991 | Garber | 395/500 |
| 5,175,853 | 12/1992 | Kardach et al. | 395/650 |
| 5,226,122 | 7/1993 | Thayer et al. | 395/275 |
| 5,255,379 | 10/1993 | Melo | 395/400 |
| 5,261,114 | 11/1993 | Raasch et al. | 395/800 |
| 5,274,834 | 12/1993 | Kandach et al. | 395/800 |
| 5,283,889 | 2/1994 | De Lisle et al. | 395/500 |
| 5,303,378 | 4/1994 | Cohen | 395/700 |
| 5,381,530 | 1/1995 | Thayer et al. | 395/275 |
| 5,392,420 | 2/1995 | Balmer et al. | 395/500 |

FOREIGN PATENT DOCUMENTS 0426386  4/1991  European Pat. Off. .

OTHER PUBLICATIONS

Pentium Processor User's Manual, vol. 3: Architecture and Programming Manual, Intel Corp. 1993, pp. 20–1 to 20–9.
Donald Alpert et al, "Architecture of the Pentium Microprocessor"; IEEE Micro, Jun. 1993; pp. 11–21.

Primary Examiner—Meng-Ai An
Attorney, Agent, or Firm—Pravel, Hewitt, Kimball & Krieger

[57] ABSTRACT

A system management mode address correction system for a computer provides correct address values on the address bus when the computer is in system management mode. Conventionally, bit 20 of the microprocessor's address outputs may be masked by asserting the FORCE A20 signal. The computer system also operates in a system management mode, which requires all of the address bits to be available for proper access to the system management interrupt vector. When the computer is in system management mode, the computer's microprocessor asserts a system management interrupt active (SMIACT*) signal. This signal is provided to a circuit which also receives the FORCE A20 signal. While the SMIACT signal is deactivated, the control circuit provides the true FORCE A20 signal to the computer system. When an SMI occurs, the SMIACT signal is activated and the FORCE A20 signal is disabled. As a result, the address generated by the microprocessor is asserted on the address bus.

10 Claims, 4 Drawing Sheets

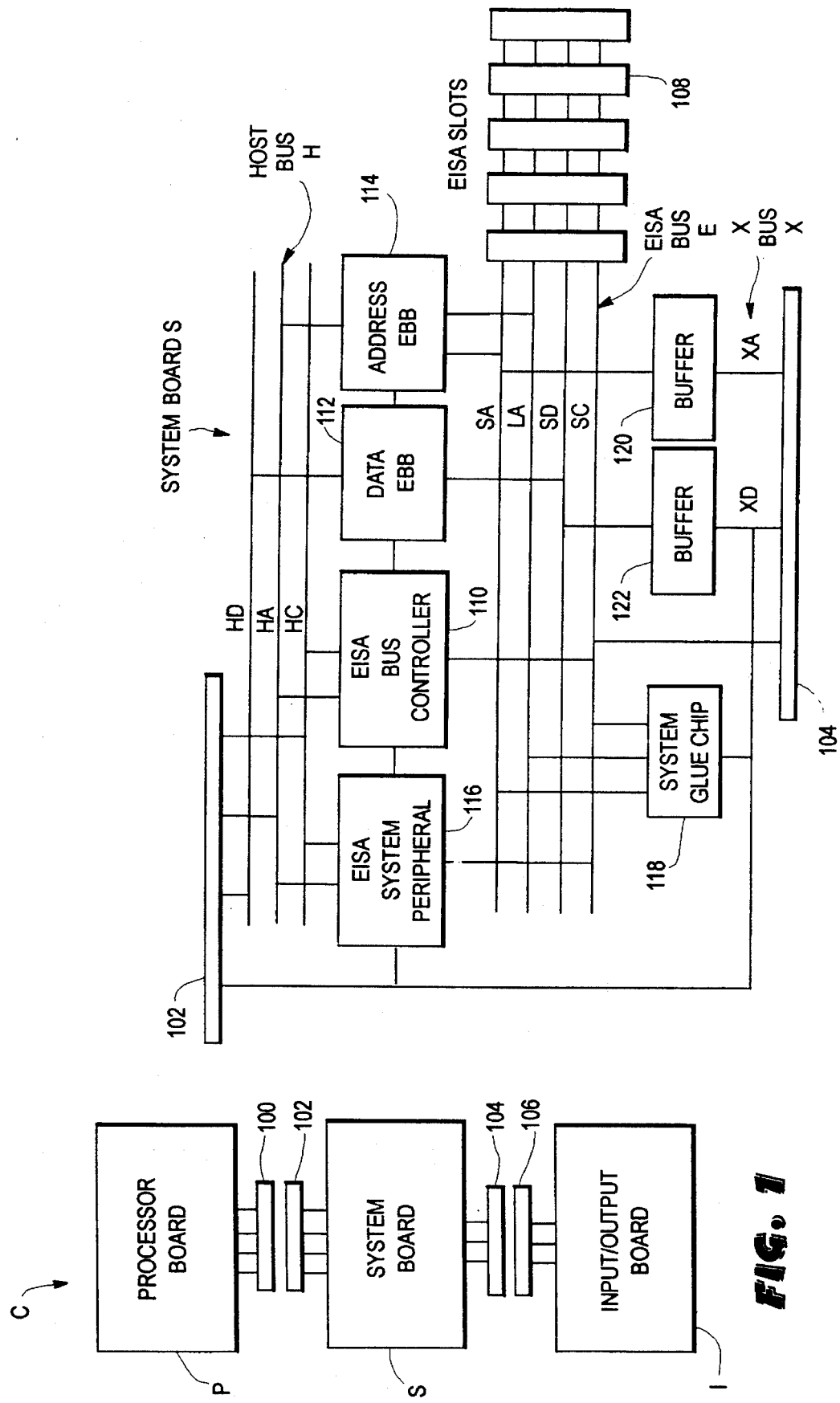

CIRCUIT FOR DISABLING AN ADDRESS MASKING CONTROL SIGNAL USING OR GATE WHEN A MICROPROCESSOR IS IN A SYSTEM MANAGEMENT MODE

BACKGROUND OF THE INVENTION

1. Field of the Invention

The invention relates to interrupt routines in computer systems, and more particularly, to assertion of the proper interrupt starting address on an address bus when a system management interrupt is asserted.

2. Description of the Related Art

In the early years of personal computers, the International Business Machines (IBM) PC computer dominated the field. The IBM PC enjoyed sensational success, for it was one of the first affordable yet reasonably powerful desktop computers. Eventually, the domination of the IBM PC became so widespread that the IBM PC set the standards for personal computer architecture, system design, and software.

The IBM PC used the Intel Corporation's 8088 microprocessor in its central processing unit (CPU), which employs a 20-bit address bus for accessing system memory and I/O devices. Because the IBM PC so thoroughly dominated the personal computer market, software vendors created an array of software for the 20-bit bus of the 8088 microprocessor and the 8086 microprocessor. Much of this software forms the foundation of modern software. Consequently, due to the early dominance of the 20-bit bus in the IBM PC and the ground-breaking software created for it, many basic applications in use today are based on a 20-bit address bus.

The next generation of extremely successful IBM personal computers was the IBM PC/AT. To provide access to a wider range of memory and I/O devices, the IBM PC/AT architecture incorporated a 24-bit bus. At the heart of the IBM PC/AT was the Intel Corporation 80286 microprocessor, which utilizes a 24-bit address bus. Although the 24-bit addressing capability of the 286 microprocessor could drive the PC/AT's 24-bit bus, a standard 24-bit configuration was incompatible with certain of the software that had been developed for the 20-bit 8088 microprocessor. This was partially because the 8088 instruction register, when it reaches its limit of FFFFFh, rolls over to an initial value of 00000h. Thus, the memory space for an 8088 system can be viewed as continuous from the upper limit (FFFFFh) of the 20-bit address bus to the initial value (00000h). A 24-bit counter, however, generates a value of 100000h after 0FFFFFh, and does not roll over. Because some programs rely on the rollover characteristic, these programs are not compatible with a 24-bit address bus which continues to increment.

To maintain compatibility, an address bit 20 mask signal was incorporated into the computer system to simulate the rollover of the 8088 counter. Although several names and logic senses are used to designate the address bit 20 mask signal, the signal is referred to as the FORCE A20 signal herein, which is the common designation for the signal. When asserted, the FORCE A20 signal causes bit 20 of the address bus (bit A20) to be masked so that bit 20 is held low at all times, regardless of the value generated by the microprocessor. The FORCE A20 signal is controlled by a register that may be written by software. By driving bit A20 low, the FORCE A20 signal causes the address value asserted on the bus to simulate the rollover of the 8088 microprocessor. For example, when a 24-bit counter reaches the value 0FFFFFh, the next increment causes the counter value to become 1000000h. Consequently, the next address accessed would be 100000h, not 000000h which is accessed in an 8088 microprocessor system. When the FORCE A20 signal is asserted, however, bit A20 of the address bus is driven low. As a result, the value asserted on the address bus is 000000h, which is the proper value required to simulate the rollover of the 8088 instruction register.

Another significant development in personal computer systems is the system management interrupt (SMI). Originally, SMIs were power management interrupts devised by Intel Corporation for portable systems. Portable computers often draw power from batteries which provide a limited amount of energy. To maximize battery life, an SMI is asserted to turn off or reduce the power to any system component that is not currently in use. Although originally meant for laptop models, SMIs have become popular for desktop and other stationary models as well, and for purposes other than power management.

SMIs are asserted by either an SMI timer, by a system request or by other means. An SMI is a nonmaskable interrupt having the highest priority in the system. When an SMI is asserted, an Intel microprocessor maps a portion of memory referred to as the system management memory (SMRAM) into the main memory space. The entire CPU state is then saved in the SMRAM in stack-like, last in/first out fashion. After the CPU state is saved, the microprocessor begins executing an SMI handler routine, which is an interrupt service routine to perform specific system management tasks, like reducing power to specific devices. While the routine is executed, other interrupt requests are not serviced, and are ignored until the interrupt routine is completed or the microprocessor is reset. When the SMI handler completes its task, the CPU state is retrieved from the SMRAM, and the main program continues.

In the first processors to use SMIs, the Intel Corporation 80386SL and 80486SL microprocessors, the SMRAM is mapped into the main memory space between 30000h and 3FFFFh. Data regarding the CPU state is stored starting at 3FFFFh going down like a conventional stack. After the CPU state is saved in the SMRAM, the microprocessor starts the SMI handler at memory address 38000h located in the SMRAM space. In the 80386 and 80486 microprocessor generations, the SMI start address is stored in a non-accessible register so that it cannot be changed by the programmer. Similarly, the use of the memory space between 30000h and 3FFFFh is preset into the microprocessor and unchangeable. Although this placement of the SMRAM and starting address is stable and known, it is often inconvenient. Any data stored in the main memory space between 30000h and 3FFFFh before the SMI is asserted is likely to be overwritten by the SMI handler and lost, unless hardware is developed which maps in special memory and maps out conventional memory. This mapping requirement has the problem of requiring extra logic and forces abrupt changes in memory contents necessitating flushing of any cache memory system. This has a cost and performance drawback. If the mapping is not performed, the software must be carefully designed around the memory space used by the SMRAM in order to prevent inadvertent loss of data.

To remedy this inconvenience, the latest generation of microprocessors from Intel Corporation, known as the Pentium or P5 microprocessors, permit the SMI handler starting address and the location of the SMRAM space to be changed by the user. Under the Pentium design, the SMI starting address stored in the microprocessor register is initially set to the conventional 30000h value. Consequently, when the first SMI is asserted, the SMI handler starts at address 38000h. While the SMI handler routine is executing, however, it may provide a different area of memory to be used as the SMRAM. This new SMRAM may start at any location in the main memory space chosen by the programmer. The new SMRAM comprises a 64 kbyte block beginning at the new SMRAM start address. When the SMI handler finishes, the new starting address replaces the old starting address in the microprocessor's SMI starting address register.

When the next SMI is asserted, the microprocessor maps the new 64 kbyte block of memory into the main memory space as the SMRAM, and starts the SMI handler at the new starting address at the midpoint of the new SMRAM. For example, during the first SMI service routine, the programmer may change the SMRAM starting point from 030000h to 100000h. When the SMI is next asserted, the microprocessor maps the SMRAM into main memory space between 100000h and 10FFFFh. The microprocessor then references address 108000h for the SMI handler. This feature thus allows the programmer to choose a more convenient location in the main memory for the SMRAM.

Although the ability to relocate the SMRAM provides a convenient option to the programmer, it presents a problem for the computer architecture designer. As previously described, when the FORCE A20 signal is asserted, bit 20 of the address bus is driven low, regardless of the value asserted by the microprocessor. When an SMI is generated, the SMRAM is mapped into the main memory space designated by the programmer. If the 64 kbyte block of main memory is an odd Mbyte block instead of an even Mbyte block, bit 20 of the address bus must be driven high by the microprocessor. If the FORCE A20 signal is activated at the time the SMI is initiated, however, the FORCE A20 signal holds bit 20 of the address bus low. Consequently, the address value that is actually asserted on the bus is 1 Mbyte lower than the interrupt vector provided by the programmer. For example, if the start address chosen by the programmer is 308000h, the SMRAM should be mapped into the memory space between 300000h and 30FFFFh. If the FORCE A20 signal is asserted, however, bit 20 is held low, so that the address range actually provided to the main memory is 200000h to 20FFFFh, and the SMI handler starting address appearing on the bus is 208000h. The CPU state is then saved starting at 20FFFFh and going down, potentially overwriting important data stored in main memory. When the microprocessor obtains the new starting address, the address asserted is 208000h, which does not contain the SMI handler routine. Consequently, the system suffers an error and must be reset.

Because of this problem, a programmer choosing an SMRAM location in a conventional system is limited to only half of the potential main memory space in which to place the SMRAM. If the programmer inadvertently selects an SMRAM area within an odd Mbyte block of the main memory, important data may be overwritten and the system may suffer a failure. As a result, the flexibility provided to the programmer to select a convenient location for the SMRAM is limited to only half of the available memory space.

SUMMARY OF THE PRESENT INVENTION

Briefly, a computer system according to the present invention provides proper addressing for SMIs by disabling the address bit 20 masking function while the SMI handler controls the system. A control circuit in the computer system determines whether an SMI is in progress. If not, the control circuit provides the FORCE A20 signal to the computer system to simulate the rollover of the 8088 microprocessor. If an SMI is in progress, however, the FORCE A20 signal is disabled. Consequently, bit 20 of the address bus is not masked and asserts its true value, generating the proper address on the address bus.

In the preferred embodiment, the computer system utilizes a Pentium microprocessor. The Pentium microprocessor asserts an SMIACT* signal while an SMI is in progress. The SMIACT* signal is provided to a control circuit which also receives the FORCE A20 signal. While the SMIACT* signal is deactivated, the control circuit provides the true FORCE A20 signal to the computer system and permits bit A20 to be masked. When an SMI occurs, SMI processing begins and the SMIACT* signal is asserted. When the SMIACT* signal is active, the FORCE A20 signal is disabled. Consequently, the value of the FORCE A20 signal does not affect the value of bit 20 of the address bus. Therefore, the address generated by the microprocessor is asserted on the address bus and the proper starting address is accessed. Because all addresses in the main memory space can be asserted without bit A20 being masked, a programmer using the present computer system may select any portion of the main memory for the SMRAM.

BRIEF DESCRIPTION OF THE DRAWINGS

A better understanding of the present invention can be obtained when the following detailed description of the preferred embodiment is considered in conjunction with the following drawings, in which:

FIG. 1 is a block diagram of a computer system incorporating the present invention;

FIG. 2 is a block diagram of the system board of FIG. 1;

DETAILED DESCRIPTION OF THE PREFERRED EMBODIMENT

Figure 3:
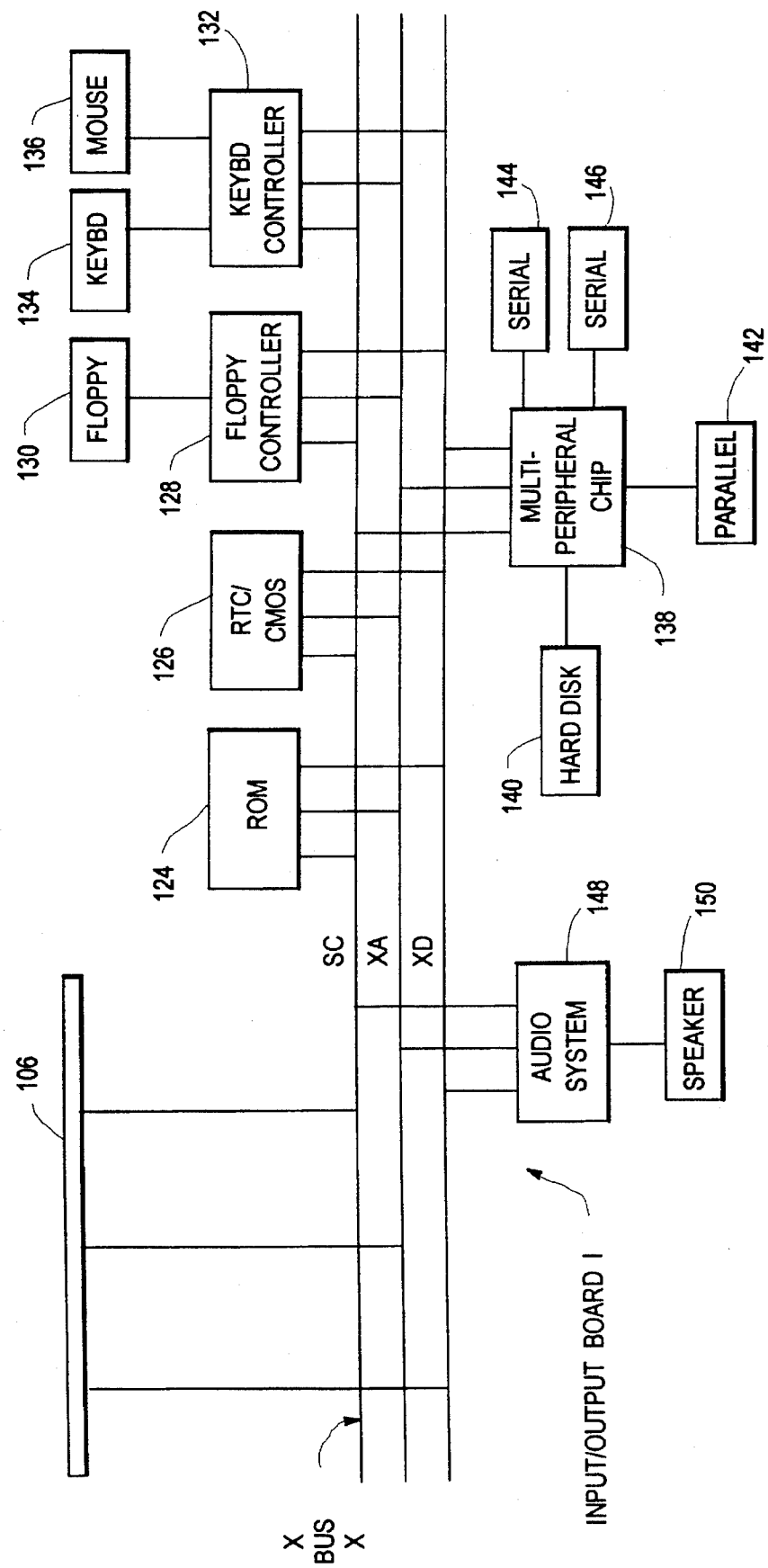
FIG. 3 is a block diagram of the input/output board of FIG. 1.

Referring now to FIG. 1, a computer system C according to the preferred embodiment is shown. A processor board P contains the processor, cache memory and main memory and associated equipment and a connector 100, preferably a card edge. A system board S includes a connector 102 to receive the connector 100, preferably a socket to receive a card edge. The system board S contains common system elements and slots or connectors for interchangeable circuit boards. The system board S also contains an additional connector 104. The connector 104 mates with a connector 106 on an input/output (I/O) board I. Preferably the I/O board I contains certain I/O related features of the computer C, such as the floppy and hard disk drive control units, an audio system and the parallel and serial ports. Additionally, the real time clock and CMOS memory is on the I/O board I. Each of the processor board P, system board S and I/O board I are detailed below.

This is noted to be an exemplary and preferred embodiment of the computer system C and it is understood that numerous other embodiments, such as having all of the components on a single system board or mother board as is common, could be readily developed.

Referring now to FIG. 2, a block diagram of the system board S is shown. Two main buses, a host bus H and an EISA bus E, form the logical back bones of the system board S. The host bus H has three components, the host data or HD bus, the HA or host address bus and the HC or host control bus. Preferably the HD bus is 64 bits wide and the HA bus is provided for a 32 bit addressing space. The EISA bus E has four major components, the SA and LA or system and early address buses, the SD or system data bus and the SC or system control bus. A plurality of EISA slots 108 are connected to the EISA bus E. An EISA bus controller 110 provides the necessary capabilities to convert between host bus H cycles and EISA bus E cycles and is connected between the HA and HC buses and the SC bus. The EISA bus controller 110 is connected to control a data EBB or EISA bus buffer 112, which provides the necessary data transceiving functions between the host bus H and the EISA bus E and provides the data assembly and disassembly requirements of an EISA system. Similarly, the EISA bus controller 110 provides the control function for an address EISA bus buffer or EBB 114. The address EBB 114 provides transceiving capabilities between the EISA bus E and the host bus H and in addition latches the HA bus signals to form the SA bus signals as appropriate.

The computer C includes certain fundamental operations such as an interrupt system, a DMA controller and a number of timers, as well as arbitration of the EISA bus E. These components are all contained in the EISA system peripheral 116, which is connected to the HA, HC and SC buses. A chip referred to as the system glue chip 118 is connected to the EISA bus E and to a bus referred to as the XD or X data bus and performs numerous miscellaneous functions necessary in the computer system C.

Finally, a third bus, referred to as the X bus X, is provided to the connector 104. The X bus X has address XA, data XD and control SC portions. The XA lines are developed from the SA bus by means of a buffer 120, while the XD bus is formed from the SD bus by means of a buffer or transceiver 122. Preferably the XD bus is 16 bits wide, while the XA bus is the same width as the SA bus. The host bus H and the XD bus are provided to the connector 102 for provision to the processor board P. In addition, the XD bus is connected to the EISA system peripheral 116.

Referring now to FIG. 3, the I/O board I is shown in more detail. The backbone of the I/O board I is the X bus X. Connected to the X bus X is a ROM or read only memory 124, which contains the basic operating sequences of the computer system C. The ROM 124 is preferably a flash EPROM to allow ease of changing of the basic operating sequences. A real time clock (RTC)/CMOS unit 126 is connected to the X bus X to provide real time clock functions and longer term memory capabilities. A floppy disk controller 128 is connected to the X bus X and receives a floppy disk unit 130. A keyboard controller 132, typically an 8042 device, is connected to the X bus X and receives a keyboard 134 and a mouse or pointing device 136. A multiple peripheral chip 138 is connected to the X bus X and provides an interface to a hard disk unit 140, a parallel port 142 and two serial ports 144 and 146. Finally, an audio system 148 is connected to the X bus X to provide audio functions, with a speaker 150 connected to the audio system. Other components could be provided on the I/O board I if desired. Preferably, the graphics system in the preferred computer system C is provided on a separate add in card located in an EISA slot 108 and is not necessarily located on the I/O board I.

Figure 4:
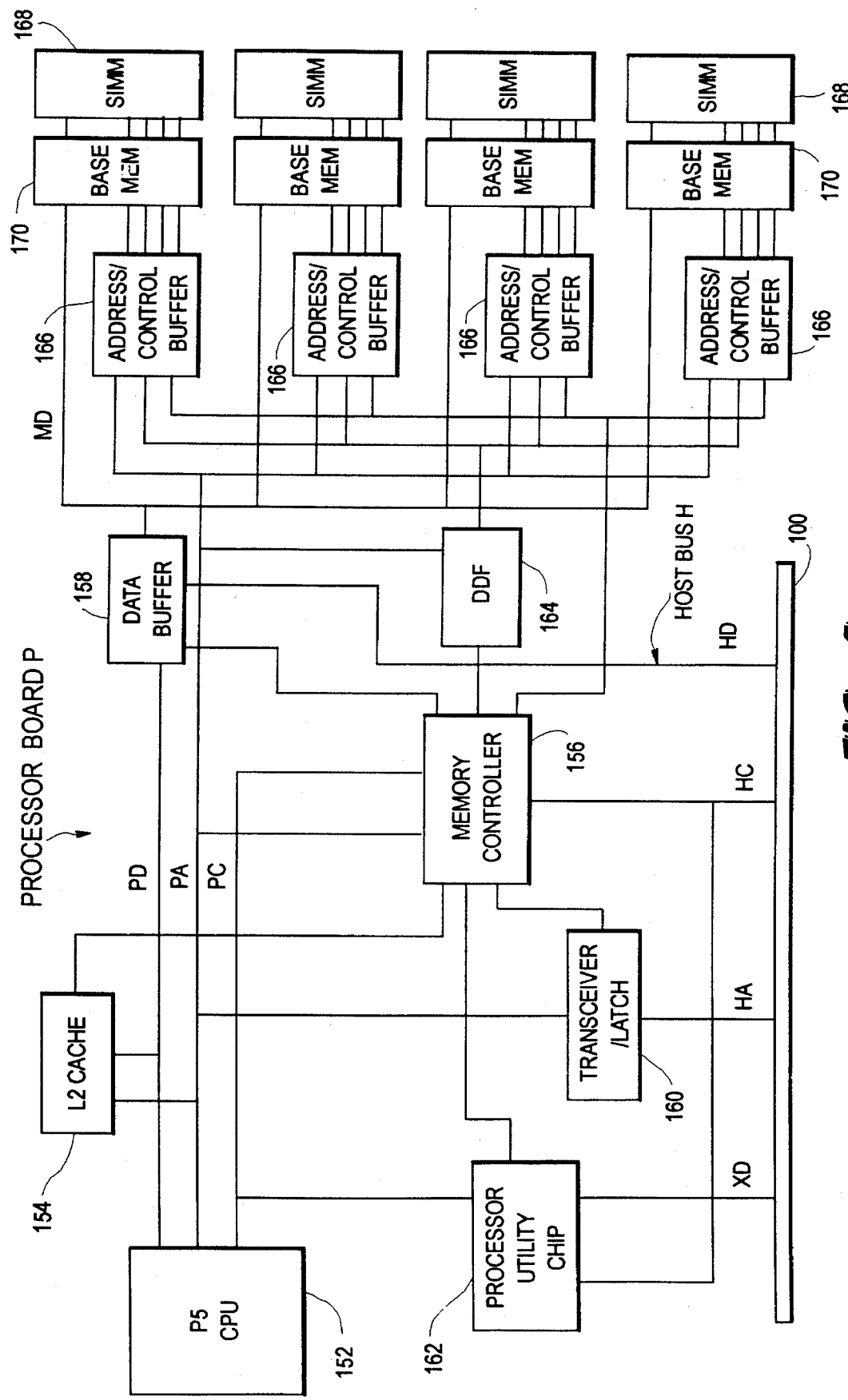
FIG. 4 is a block diagram of the processor board of FIG. 1.

Referring now to FIG. 4, the processor board P is shown in more detail. The primary component on the processor board P is the CPU 152, in the preferred embodiment preferably the P5 or Pentium microprocessor from Intel Corp., the next generation design after the 80486. The P5 is a very high performance microprocessor having superscalar architecture and integrated and separate code and data caches. Like several recent generations of Intel Corporation products, the P5 microprocessor operates in both protected and real modes. In protected mode, the entire 36-bit address bus and the full instruction set may be used. The P5 microprocessor includes system management memory or SMRAM functions and includes an SMI pin as described in the background. Additionally, as in the 80486, a FORCE A20 signal provided to the P5 CPU causes address bit 20 to be masked before performing a lookup in the internal cache or driving a memory cycle to the system. The masking of bit A20 simulates the rollover of the 8088 microprocessor.

Three buses are connected to the P5 CPU 152, the PD or processor data bus, the PA or processor address bus and the PC or processor control bus. A level two (L2) or external cache 154 is connected to the PD and PA buses and receives control signals from a memory controller 156. In the preferred embodiment the memory controller 156 contains conventional memory controller functions and additionally includes the cache controller capabilities necessary to operate the L2 cache 154.

A data buffer 158 is connected to the PD bus and develops two new buses, the HD or host data bus and the MD or memory data bus. The HD bus is connected to the connector 100 for connection to the system board S. The data buffer 158 is controlled by the memory controller 156. A transceiver/latch unit 160 is connected between the PA bus and the HA bus to provide latching and transceiving capabilities of addresses between the P5 CPU 152 and the host bus H. The transceiver/latch 160 is controlled by the memory controller 156.

A processor utility chip 160 provides certain necessary utility operations for use with the CPU 152. The processor utility chip 162 is connected to the XD bus and is controlled by the memory controller 156. The output of the processor utility chip 162 is preferably provided to the PC bus to provide control functions of the P5 CPU 152. The memory controller 156 is also connected to a unit referred to as the DDF or data destination facility 164. The DDF 164 performs memory module enabling, address translation and memory segment or page property storage. The DDF 164 provides memory capabilities to indicate which particular bank of memory is to be enabled, performs address translation on a 128k byte boundary and provides indications of certain characteristics of each 128k block, such as whether it is write protected, high speed, and/or cacheable and whether that portion can be utilized by a writeback cache. Operation of the DDF 164 is more completely explained in U.S. Pat. No. 5,341,494, and E.P.O. Application No. 0 426 386, publication date May 8, 1991, both of which are hereby incorporated by reference. The outputs of the DDF 164 are a series of RASEN enable signals for enabling a particular memory module, certain translated addresses to indicate the address bits above 128k, and page characteristics bits.

The memory portion of the processor board P is provided as four identical modules, each module containing an address/control buffer 166, one sockets for receiving an individual SIMM unit 168 and base memory 170. The address/control buffer 166 receives the PA bus, the address and enable outputs of the DDF 164 and control signals from the memory controller 156. The outputs of the address/control buffer 166 are the addresses provided to the SIMMs 168 or base memory devices 170 and the RAS*, CAS, and WE, signals. These signals are provided to each of the SIMMs 168. Additionally, each SIMM 168 or base memory device 170 is connected to the memory data bus MD. As indicated, there are four like modules. Other configurations of the processor board P could be developed, with variations obvious to one skilled in the art, with certain details provided below.

Figure 5:
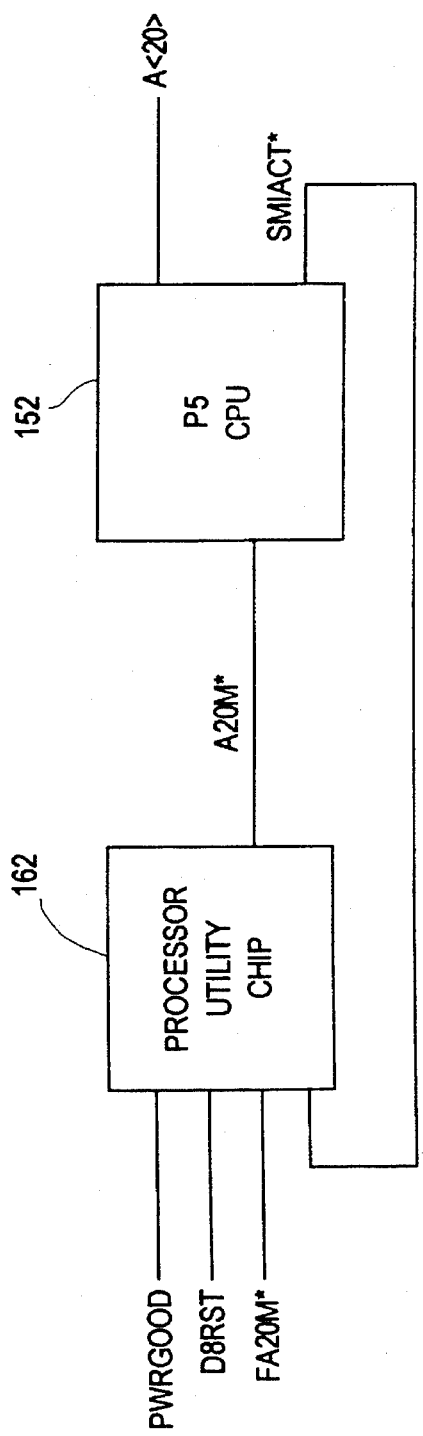
FIG. 5 is a block diagram of a portion of the processor board of FIG. 4 and illustrates particular interconnections.

The P5 CPU 152 drives the processor address bus PA and receives the FORCE A20 signal. Referring now to FIG. 5, the P5 CPU 152, the processor utility chip 160, and a set of relevant signals are illustrated. For the purposes of this disclosure, a signal designation followed by an asterisk (*) indicates that the signal is active when asserted low. In contrast, the absence of the asterisk indicates that the signal is active when driven high. Bit 20 is held low by the P5 CPU 152 when the A20M* signal received by the P5 CPU 152 is low. Thus, when the A20M* signal is deactivated, the P5 CPU 152 drives the processor address bit 20 conventionally. When the A20M* signal is low, processor address bit 20 is masked and is driven low as long as the A20M* signal remains active. This is the conventional microprocessor response to the FORCE A20 signal.

The A20M* signal is generated by the processor utility chip 160. The A20M* signal is controlled according to the following equation:

A20M*=FA20M*+SMIACT*+RSTSYS

The FA20M* signal is the conventional FORCE A20 signal, and is generated conventionally. In the preferred embodiment, the system glue chip 118 generates the FA20M* signal by trapping operations to the system keyboard controller which indicate a request to change the FA20M* signal and performing the requested change directly. The FA20M* signal is enabled by writing the proper data bits to a specific control register in the system. Similarly, the FA20M* signal may be disabled by resetting the control register bits.

The SMIACT* signal is generated by the P5 CPU 152 and is provided to the processor utility chip 160. The SMIACT* signal indicates that the P5 CPU 152 is operating in system management mode. Operation in system management mode indicates that an SMI has been asserted and is currently being serviced by the P5 CPU 152. When the microprocessor enters system management mode, a system management memory (SMRAM) space is mapped into memory. The entire CPU state is then stored in the SMRAM. While in system management mode, the microprocessor operates in real mode, but uses 32-bit wide addresses. System management mode is transparent to software, and is designed for power conservation and other features. When the SMI service routine is completed, the SMIACT* signal is deactivated.

The RSTSYS signal is the system reset request signal. This output is generated by the processor utility chip 160, and is used to reset system logic other than the P5 CPU 152. The RSTSYS signal is asserted when the power good (PWRGOOD) signal is sampled inactive or when the power on reset (DBRST) signal is sampled active. The PWRGOOD signal indicates that the power supply of the computer system is supplying sufficient power and operating properly. The DBRST signal only goes active immediately after the system is powered up and the main processor clock is stable. Thus, the RSTSYS signal goes active until the power supply to the computer system is at adequate levels or when the system is first powered up. The RSTSYS signal toggles to its inactive state after the PWRGOOD signal is sampled active and the DBRST signal has returned to its inactive state. In other words, the RSTSYS signal returns to its inactive state when the power supply is turned on and operating functionally and the processor clock signal is stable.

Figure 6:
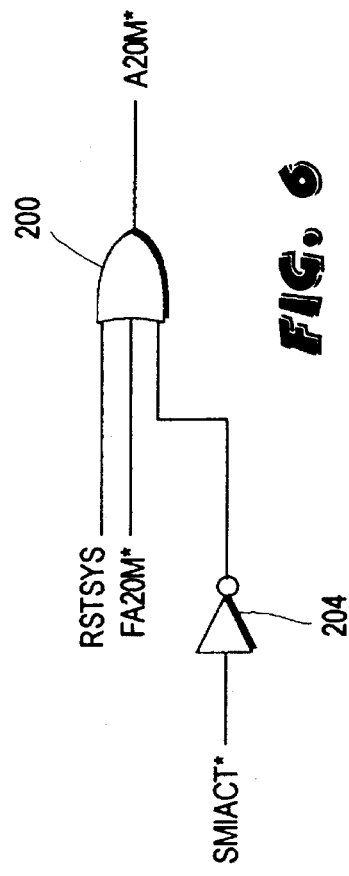
FIG. 6 is a logic diagram of the signals generating the A20M* signal of FIG. 5.

FIG. 6 illustrates a logic circuit contained in the processor utility chip 160 for implementing the logic equation above. The A20M* signal is generated by an OR gate 200, which has three inputs. A first input receives the RSTSYS signal so that the A20M* signal is driven high when the RSTSYS signal is active. Similarly, a second input of the OR gate 200 is connected to the inverse of the SMIACT* signal from an inverter 204. When the P5 CPU 152 is in system management mode, the SMIACT* signal is low, driving A20M* high and preventing bit A20 from being masked. The last input is connected to the FA20M* signal so that the A20M* signal follows the FA20M* signal when RSTSYS and SMIACT* are inactive.

As shown by the equation and FIG. 6, bit 20 of the processor address bus is masked only if the FA20M* signal is asserted, the system is not being reset, and the P5 CPU 152 is not in system management mode. Thus, the processor address bit 20 may only be masked if the P5 CPU 152 is not performing an SMI routine. If the P5 CPU 152 enters system management mode, the SMIACT* signal is activated. This causes the A20M* signal to be deactivated, and the A20M* remains deactivated until the P5 CPU 152 exits system management mode and the remaining conditions of the equation are satisfied. Consequently, the P5 CPU may drive the proper starting address onto the bus without masking bit A20.

A computer system according to the preferred embodiment allows bit A20 to be masked to simulate the rollover of the 8088 microprocessor, yet provides the proper starting address on the address bus when an SMI is asserted. Thus, the programmer may relocate the system management memory at any location in the main memory. When the system is initially powered up, the computer executes a power-on self-test (POST) program. Part of the POST program includes asserting an initial SMI to the P5 CPU. When the initial SMI is asserted, the P5 CPU maps the SMRAM into the main memory space between 30000h and 3FFFFh. The CPU state is then saved in the SMRAM starting at 3FFFFh and growing down in stack-like fashion. The P5 CPU then enters real mode and begins executing a special SMI interrupt service routine designed for the POST program. This special SMI routine changes one of the lines of data saved in the SMRAM to replace the starting address for the SMI handler. The old SMI starting address is replaced with the value desired by the programmer for the new SMI starting address. The SMI handler then completes the remainder of the SMI routine and the stored CPU state is retrieved from the SMRAM. When the CPU state is restored to the CPU, the P5 CPU exits the SMI handler and continues operations.

When the POST program is complete, control of the computer system is turned over to the operating system. While the computer system operates conventionally, an SMI may be generated by some source, like a battery low signal, a screen saver timer, a deadman timer on the hard drive, a processor request or on a periodic basis. When the SMI is asserted, the P5 CPU maps the system management memory into the 64 kbyte portion of the main memory space designated by the SMRAM starting address. For example, if the new SMRAM starting address is 590000h, the SMRAM is mapped into the memory space between 590000h and 59FFFFh. To map the SMRAM into the main memory, the P5 CPU drives the address values onto the address bus to indicate the proper addresses. Before the SMRAM is mapped into the memory, however, the SMIACT* signal is driven low to indicate that the P5 CPU has entered system management mode. Although the A20M* signal is normally activated when the P5 CPU is placed into real mode, the active SMIACT* signal drives the output of the OR gate 200 high and disables the A20M* signal. As a result, the SMRAM starting address generated by the P5 CPU is 590000h, instead of the 490000h which would be asserted if the A20M* signal remained activated. After the SMRAM is mapped into main memory, the CPU state is saved in the SMRAM and the P5 CPU starts executing the SMI handler routine at handler starting address 598000h. Thus, a computer system according to the preferred embodiment provides correct addressing for the SMI handler when the FORCE A20 signal is asserted. Consequently, system errors due to improper addressing are avoided, and the programmer is permitted to select a 64 kbyte portion of the main memory at any location in the main memory space for the SMRAM.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A system management mode address correction system for a computer having a microprocessor, the microprocessor having n address outputs and a register having n bits for providing values to the n address outputs, the n address outputs having a rollover effect as the values are incremented, the microprocessor further having a masking means responsive to a masking control signal for masking at least one of the n address outputs so that as the values are incremented the register values at the n address outputs simulate the rollover effect of a register having less than n bits and wherein the microprocessor can operate in a system management mode which utilizes all n bits of the n address outputs, the system management mode address correction system comprising:

means for selectively providing the masking control signal to the masking means;

determining means connected to the microprocessor for determining if the microprocessor is operating in system management mode; and disabling means responsive to said determining means and connected to said means for providing the mask control signal for disabling said masking control signal when the microprocessor is in system management mode, wherein said disabling means includes an OR gate, the OR gate having an output providing the masking control signal connected to the microprocessor, a first input receiving the masking control signal and a second input connected to said determining means.

2. The system management mode address correction system of claim 1, wherein the microprocessor is an Intel Corporation Pentium compatible microprocessor, and wherein said determining means includes a system management interrupt active signal generated by the Pentium microprocessor.

3. The system management mode address correction system of claim 1, wherein n is 36.

4. The system management mode address correction system of claim 3, wherein the masking means masks bit 20 of the n address outputs so that the register output simulates the rollover effect of a register having 20 bits.

5. The system management mode address correction system of claim 1, wherein n is 36 and the microprocessor is an Intel Corporation Pentium compatible microprocessor having an address bit 20 mask signal input, and wherein the masking means is connected to said address bit 20 mask signal input of the Pentium compatible microprocessor.

6. A computer system having corrected system management mode addressing, comprising:

a microprocessor capable of initiating a system management interrupt routine, including:

means for asserting a system management interrupt active signal while said system management interrupt routine is in progress;

a set of n address outputs having a rollover effect as the n address outputs are incremented; and means responsive to a masking control signal for masking one of said n address outputs;

means for selectively providing the masking control signal to said masking means; and address correction means responsive to the system management interrupt active signal assertion means and connected to said means for selectively providing the masking control signal for disabling said masking control signal when said system management interrupt active signal is asserted, wherein said disabling means includes an OR gate, the OR gate having an output connected to the microprocessor, a first input receiving said masking control signal, and a second input connected to said system management interrupt active signal assertion means.

7. The computer system of claim 6, wherein said microprocessor is an Intel Corporation Pentium compatible microprocessor, and wherein said system management interrupt active signal assertion means includes the system management interrupt active signal generated by the Pentium compatible microprocessor.

8. The computer system of claim 6, wherein n is 36.

9. The computer system of claim 8, wherein the masking means masks bit 20 of the n address outputs so that as the n address outputs are incremented the n address output simulates the rollover effect of a set of n address outputs having 20 bits when said masking control signal is asserted.

10. The computer system of claim 7, wherein the microprocessor is a Pentium compatible microprocessor having an address bit 20 mask signal input, and wherein said means for selectively providing the masking control signal is connected to the address bit 20 mask signal input of the Pentium compatible microprocessor.

* * * * *

UNITED STATES PATENT AND TRADEMARK OFFICE
CERTIFICATE OF CORRECTION

PATENT NO.    : 5,509,139
DATED         : April 16, 1996
INVENTOR(S)   : Basem A. Ayash et al.

It is certified that error appears in the above-identified patent and that said Letters Patent is hereby corrected as shown below:

Column 10,
Line 5, after "Pentium" insert -- compatible --.

Signed and Sealed this

Twenty-fourth Day of January, 2006

JON W. DUDAS
*Director of the United States Patent and Trademark Office*